United States Patent
Okamoto et al.

(10) Patent No.: US 9,809,166 B2
(45) Date of Patent: Nov. 7, 2017

(54) ALARM DEVICE FOR VEHICLE

(71) Applicant: Yazaki Corporation, Tokyo (JP)

(72) Inventors: Shinichi Okamoto, Susono (JP); Shuuji Satake, Susono (JP); Shinngo Chiba, Makinohara (JP)

(73) Assignee: Yazaki Corporation, Tokyo (JP)

( * ) Notice: Subject to any disclaimer, the term of this patent is extended or adjusted under 35 U.S.C. 154(b) by 122 days.

(21) Appl. No.: 14/873,650

(22) Filed: Oct. 2, 2015

(65) Prior Publication Data

US 2016/0023600 A1 Jan. 28, 2016

Related U.S. Application Data

(63) Continuation of application No. PCT/JP2014/059542, filed on Mar. 31, 2014.

(30) Foreign Application Priority Data

Apr. 4, 2013 (JP) .................. 2013-078862

(51) Int. Cl.
*B60Q 1/00* (2006.01)
*B60Q 9/00* (2006.01)
(Continued)

(52) U.S. Cl.
CPC .............. *B60Q 9/008* (2013.01); *B60Q 1/323* (2013.01); *B60Q 9/00* (2013.01); *E05B 39/007* (2013.01);
(Continued)

(58) Field of Classification Search
CPC .......... B60Q 9/008; B60Q 21/00; B60Q 1/00; G08B 21/00; B60R 22/48; B60R 21/00
(Continued)

(56) References Cited

U.S. PATENT DOCUMENTS 8,620,549 B2 * 12/2013 Nickolaou ............. B60Q 9/008
340/457
9,403,475 B2 * 8/2016 Cheng .................. B60Q 1/2665
(Continued)

FOREIGN PATENT DOCUMENTS

JP 08-067223 A 3/1996
JP 2001-239832 A 9/2001
(Continued)

OTHER PUBLICATIONS

International Search Report dated Jun. 24, 2014, issued for PCT/JP2014/059542.
Notification of Reasons for Refusal dated Apr. 11, 2017 issued for corresponding Japanese Patent Application No. 2013-078862.
Notification of Reasons for Refusal dated Dec. 22, 2016, issued for the Japanese patent application No. 2013-078862.

*Primary Examiner* — Toan N Pham
(74) *Attorney, Agent, or Firm* — Locke Lord LLP

(57) ABSTRACT

An alarm device for a vehicle has a sensor section detecting that the hand of a passenger approaches an opening and closing operation section H and sending an operation detecting signal, a vehicle detector detecting another vehicle approaching from behind and sending a vehicle detecting signal, a vibration unit vibrating the opening and closing operation section H, a lamp section arranged on a pillar and displaying a warning sign with the irradiation of light, and a ECU (Electric Control Unit). When the ECU receives the vehicle detecting signal and the operation detecting signal, the vibration unit operates and a warning sign is displayed on the lamp section. Thereby, when another vehicle approaches, it is possible to prevent the passenger from opening operation of the door body.

4 Claims, 3 Drawing Sheets

(51) Int. Cl.
*G08G 1/16* (2006.01)
*B60Q 1/32* (2006.01)
*E05F 15/40* (2015.01)
*E05B 39/00* (2006.01)
*E05F 15/73* (2015.01)

(52) U.S. Cl.
CPC .............. *E05B 81/77* (2013.01); *E05F 15/40* (2015.01); *G08G 1/167* (2013.01); *E05F 15/73* (2015.01); *E05Y 2400/814* (2013.01); *E05Y 2400/86* (2013.01); *E05Y 2900/531* (2013.01)

(58) Field of Classification Search
USPC .. 340/435, 436, 438, 426.22, 426.28, 545.1, 340/457, 902; 382/103; 348/148; 701/1, 701/70
See application file for complete search history.

(56) References Cited

U.S. PATENT DOCUMENTS

| | | | |
|---|---|---|---|
| 9,511,730 B1* | 12/2016 | Wu | G08G 1/166 |
| 9,514,629 B2* | 12/2016 | Chen | B60Q 9/008 |
| 2006/0255920 A1 | 11/2006 | Maeda et al. | |
| 2014/0118130 A1* | 5/2014 | Chang | G08G 1/163 |
| | | | 340/435 |

FOREIGN PATENT DOCUMENTS

| | | |
|---|---|---|
| JP | 2002-022828 A | 1/2002 |
| JP | 2006341839 A | 12/2006 |
| JP | 2008-299779 A | 12/2008 |
| JP | 2011-155775 A | 8/2011 |

\* cited by examiner

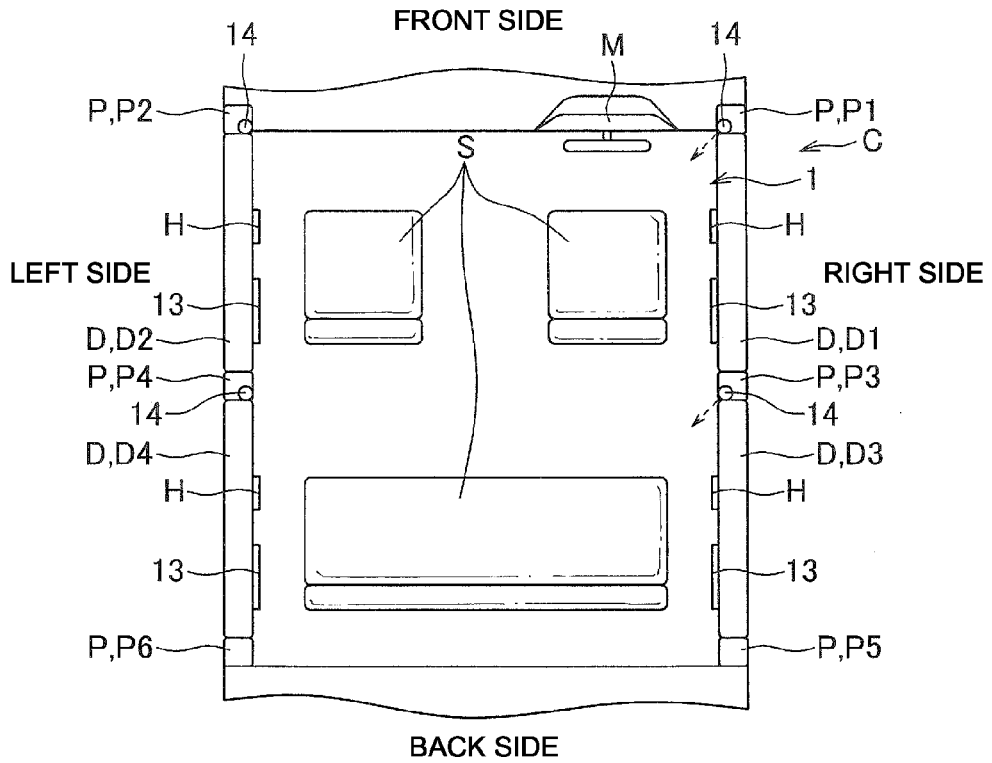
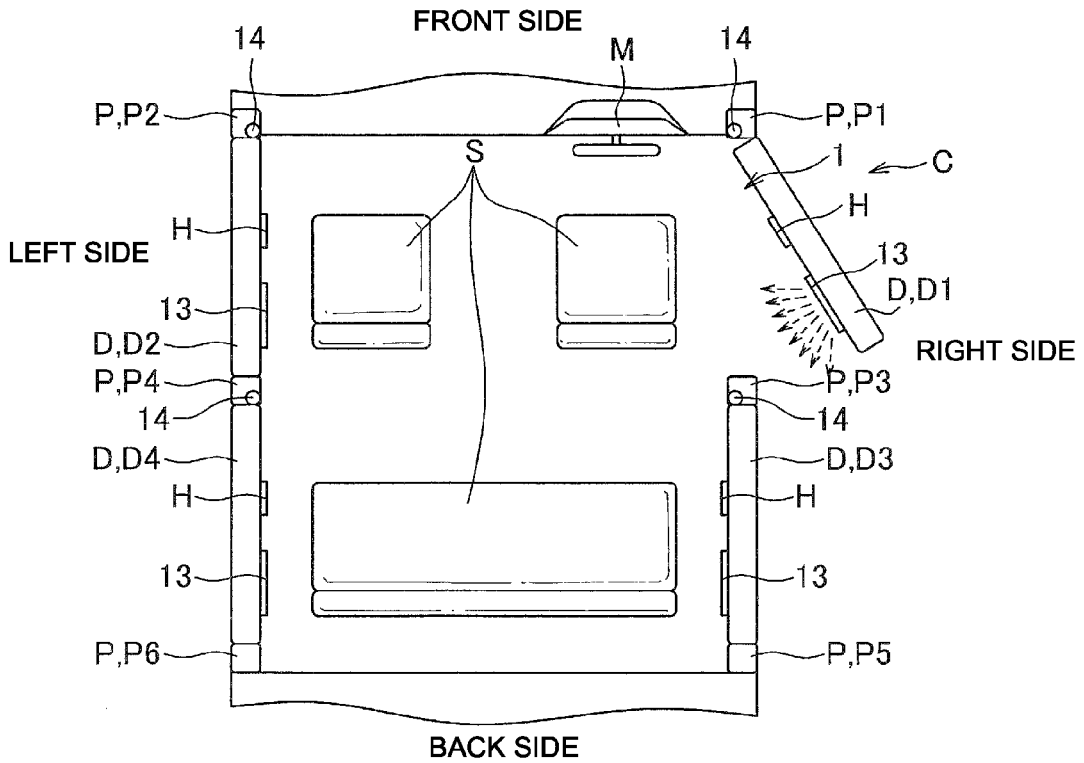

ALARM DEVICE FOR VEHICLE

TECHNICAL FIELD

The present invention relates to an alarm device for a vehicle detecting an approach of another vehicle and generating an alarm.

BACKGROUND ART

Conventionally, an alarm device for vehicle detecting an approaching vehicle and generating an alarm is disclosed (for example, see Patent Literature 1). The alarm device for the vehicle of the Patent Literature 1 alerts a passenger by flashing a lighting arranged in the vehicle room when another vehicle approaches.

CITATION LIST

Patent Literature

[PTL 1]
Patent Literature 1: JP 2008-299779A

SUMMARY OF INVENTION

Technical Problem

In the alarm device for the vehicle disclosed in the patent literature 1, when another vehicle approaches, a vehicle interior lighting turns on. However, the alarm is difficult to recognize the approach of the other vehicle. Furthermore, the alarm is confused with another alarm, and thereby disadvantage that a door body would be opened is caused.

Solution to Problem

An object of the present invention is to provide an alarm device for a vehicle to prevent a door body from being opened when another vehicle approaches.

An alarm device for a vehicle of the present invention is an alarm device for a vehicle detecting an approach of the other vehicle and generating an alarm. The alarm device for the vehicle has a vehicle detector detecting an approach of another vehicle from behind; an operation detector arranged on a door body, and detecting an approach a hand of a passenger to an opening and closing operation section of the door body; an alarm generator generating an alarm to the passenger; and a controller generating an alarm on the alarm generator when the vehicle detector detects the approach of the other vehicle, and the operation detector detects the approach of the hand of the passenger.

According to the present invention, when the other vehicle approaches and the hand of the passenger approaches the opening and closing operation section, the alarm is generated. For this reason, the passenger can easily recognize the alarm for the opening operation of the door body. Further, when the other vehicle approaches, the alarm device for the vehicle of the present invention can prevent the door body from being opened. Furthermore, even if the other vehicle approaches, the alarm is not generated when the passenger did not try to open the door body. Therefore, providing the passenger with a feeling of discomfort by generating unnecessary alarm can be avoided. In addition, even if the passenger is oblivious to the approach of the other vehicle, the alarm is generated when the hand of the passenger approaches the opening and closing operation section. Thereby, it is possible to reflexively disrupt an opening operation of the door body by the passenger.

In this case, in the alarm device for the vehicle of the present invention, preferably the alarm generator is configured to be capable of displaying the safety sign indicating that the door body can be safely opened. Further, the controller displays the safety sign on the alarm generator when the vehicle detector does not detect the approach of the other vehicle.

According to the above construction, since the alarm generator displays the safety sign when the approach of the vehicle is not detected, propriety of the opening operation of the door body can be clearly indicated.

Additionally, in the alarm device for the vehicle of the present invention, preferably the alarm generator includes at least one of an irradiation unit for irradiating light, an alarm sound generator for generating an alarm sound, a vibration unit for vibrating the opening and closing operation section, and a locking unit for locking the door body.

According to the above structure, the passenger can easily recognize the alarm. Specifically, since the vibration unit is provided, the passenger can notice surely the alarm and surely recognize that its vibration is the alarm of the opening operation of the door body even if the passenger tried to open the door body without visual confirmation. Furthermore, the alarm generator preferably includes at least two or more of an irradiation unit, an alarm sound generator, a vibration unit, and a locking unit. By combining two or more of the alarm, the passenger can more surely notice the alarm.

Also, in the alarm device for the vehicle of the present invention, preferably a warning light and an opening operation detector for detecting an opening operation of the door body are provided. The warning light is arranged on the door body, and is able to illuminate light backward. The vehicle detector is configured to be capable of measuring at least one of a distance from the other vehicle and a speed of the other vehicle. When the vehicle detector detects the approach of the other vehicle, and the opening operation detector detects the opening operation of the door body, the controller blinks the warning light with a cycle corresponding to the speed or the distance of the other vehicle measured by the vehicle detector.

According to the above construction, when the other vehicle approaches from behind and the door body is opened, the warning light flashes. As a result, it is possible to inform a passenger of the approaching other vehicle that the door body is opened, and call attention. Further, since the warning light blinks with the cycle corresponding to the speed or the distance of the approaching vehicle, calling attention can be effectively performed when the speed of the approaching vehicle is faster or the distance is shorter.

Advantageous Effects of Invention

According to the alarm deice for the vehicle of the present invention, when the other vehicle approaches and the hand of the passenger approaches the opening and closing operation section, the alarm is generated. Therefore, when the other vehicle approaches, it is possible to prevent the door body from being opened.

BRIEF DESCRIPTION OF DRAWINGS

FIG. 1A and FIG. 1B are top views showing a vehicle according to an embodiment of the present invention.

DESCRIPTION OF EMBODIMENTS

Hereafter, an embodiment of the present invention will be explained with reference to drawings. As shown in FIG. 1, a vehicle C of the embodiment in the present invention includes an alarm device for a vehicle 1, a door body D, a pillar P, a meter display M, and a seat S. The right side, left side, front side, and back side of the vehicle C in the embodiment of the present invention are shown in FIG. 1.

Figure 2:
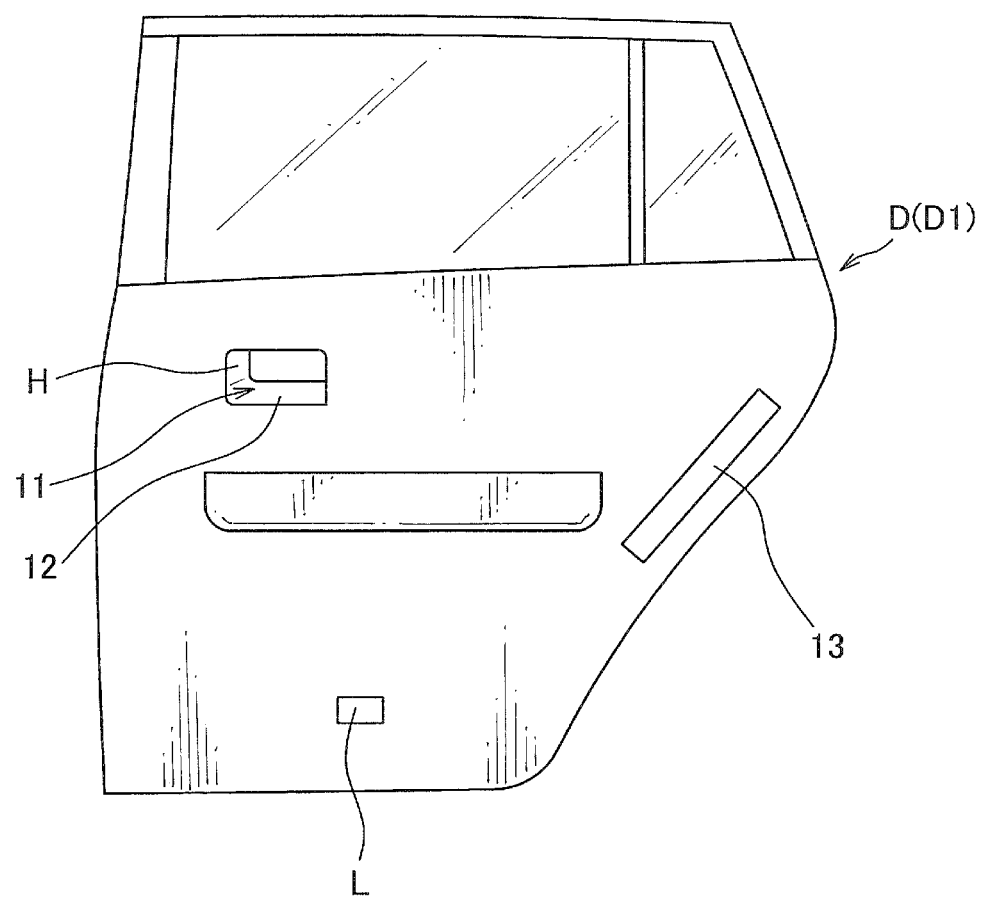
FIG. 2 is a side view showing a door body of the vehicle.

As shown in FIG. 1 or 2, the alarm device for the vehicle 1 has a sensor 11 as an operation detector, a vibration unit 12, a warning light 13, a lamp section 14 as an irradiation unit, a vehicle detector not shown, a door sensor as an opening operation detector not shown, a seat detector not shown, and a ECU (Electric Control Unit) as a controller not shown. The sensor 11 is arranged in an opening and closing operation section H of the vehicle interior side of the door body D, and detects approach of a hand of a passenger. The vibration unit 12 vibrates the opening and closing operation section H. the warning light 13 is arranged at the back side of the door body D and provided separately from the courtesy lamp L. The lamp section 14 is arranged in the pillar P. The vehicle detector detects an approach of another vehicle from the rear of the vehicle C. The door sensor detects that the door body D is opening operation. The seat detector detects a seat of the passenger in the seat S. The alarm is generated by vibrating the opening and closing operation section H with the vibration unit 12, and by displaying a warning sign described below with the lamp section 14. So, the vibration unit 12 and the lamp section 14 function as an alarm generator. Also, the door body D1 of a driver's seat side is shown in FIG. 2. Similarly, the other door bodies D2, D3 and D4 have the same functions and shapes. Hereafter, the door body D1 is explained as a representative of door body, and the explanation of the other door bodies D2, D3 and D4 will be omitted.

The sensor section 11 is for example an infrared sensor, and detects that the hand of the passenger approaches. When the approach of the hand of the passenger is detected, the sensor section 11 transmits an operation detecting signal to the ECU. When the opening operation of the door body D is detected, and the door body D is opened, the door sensor transmits an opening operation signal corresponding to each the door body D1, D2, D3, D4 to the ECU.

The lamp section 14 is arranged in an A-pillar P1 of the right side, an A-pillar P2 of the left side, a B-pillar P3 of the right side, and a B-pillar P4 of the left side, respectively. The lamp section 14 performs irradiation of the light toward the passenger according to the door body D1 of the driver side, the door body D2 of the passenger side, the door body D3 of the rear right side, and the door body D4 of the rear left side. Furthermore, the lamp section 14 is able to display for example a warning sign blinked in red and a safety sign blinked in blue. The warning light 13 operates simultaneously with the lamp section 14, and irradiates light toward the passenger in common with the lamp section 14. When the door body D is opened, the lamp section 14 blinks so that the light is irradiated rearward as shown in FIG. 1B.

The vehicle detector detects the other vehicle, and measures the speed of the other vehicle. More specifically, the vehicle detector is provided in both sides of the vehicle C, and detects the other vehicle approaching from rear of the left side or right side. When the other vehicle approaches from the rear, the vehicle detector provided in both side of the vehicle C independently transmits a vehicle detecting signal including information of the speed of the other vehicle to the ECU respectively. The vehicle detecting signal transmitted by the vehicle detector arranged in the right side corresponds to the door body D1 of the driver side and the door body D3 of the rear right side. The vehicle detecting signal transmitted by the vehicle detector arranged in the left side corresponds to the door body D2 of the passenger side and the door body D4 of the rear left side.

When the ECU receives the vehicle detecting signal corresponding to the same door body D and the operation detecting signal, the vibration unit 12 arranged in the door body D is operated, and the warning sign is displayed on the corresponding lamp section 14 as shown in FIG. 1A. Also, FIG. 1A shows a state that the lamp section 14 displays a warning sign when the vehicle detector arranged in the right side of the vehicle C transmits the vehicle detecting signal and the sensor sections 11, which are arranged in the door body D1 of the driver side and in the door body D3 of the rear right side, transmits the operation detecting signal.

Furthermore, the ECU displays the safety sign on the lamp section 14 according to the door body D that the other vehicle is not detected during stop of a vehicle. When the ECU receives an opening operation signal, the ECU blinks the warning light 13 arranged in the corresponding door body D with a cycle corresponding to the speed of the other vehicle. Further, when the ECU receives the opening operation signal, and does not receive the vehicle detecting signal, the ECU blinks the warning light 13 with a prescribed minimum cycle.

Next, operation alarm processing that the alarm device for the vehicle 1 generates an alarm when the passenger opens the door body D and opening operation alarm processing that the alarm device for the vehicle 1 generates an alarm backward when the door body D is opened will be explained with reference to FIG. 3. The operation alarm processing and the opening operation alarm processing is independently performed in each door body D1, D2, D3, D4.

Figure 3A:
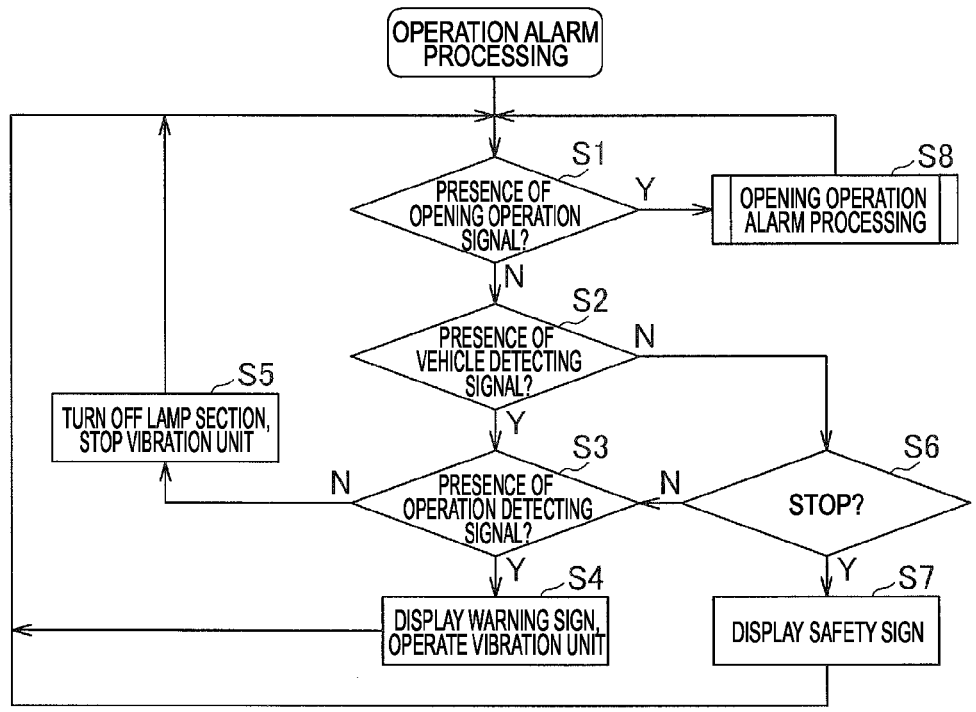
FIG. 3A and FIG. 3B are flowcharts showing a processing procedure when an alarm device for a vehicle which is provided on the vehicle generates an alarm.

The ECU starts the operation alarm processing when the door body D is unlocked from the outside of the vehicle C. First, as shown in FIG. 3A, the ECU judges the presence or absence of the opening operation signal (step S1). When the ECU does not receive the opening operation signal (No at step S1), the ECU judges the presence or absence of the vehicle detecting signal (step S2). When the ECU receives the vehicle detecting signal (Yes at step S2), the ECU judges the presence or absence of the operation detecting signal (step S3). When the ECU receives the operation detecting signal (Yes at step S3), the ECU displays the warning sign on the lamp section 14, operates the vibration unit 12 (step S4), and returns to step S1. When the ECU does not receive the operation detecting signal (No at step S3), the ECU turns off the lamp section 14, stops the vibration unit 12 (step S5), and returns to step S1.

On the other hand, when the ECU does not receive the vehicle detecting signal (No at step S2), the ECU judges whether the vehicle C stops or not (step S6). When the vehicle C is moving (No at step S6), it proceeds to step S3. When the vehicle C stops (Yes at step S6), the ECU displays the safety sign on the lamp section 14 (step S7) and then it again returns to step S1.

Figure 3B:
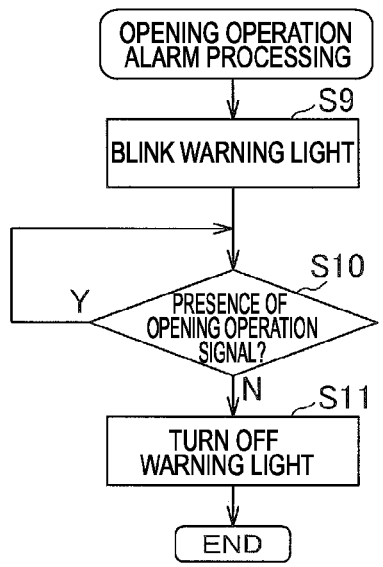

When the ECU receives the opening operation signal (Yes at step S1), the ECU stars the opening operation alarm processing (step S8). When the ECU starts the opening operation alarm processing, as shown in FIG. 3B, a warning light 13 is blinked (step S9). Next, the ECU repetitively determines whether the opening operation signal is present or not until the opening operation signal is stopped (step S10). When the ECU does not receive the opening operation signal (No at step S10), the ECU turns off the warning light 13 (step S11), the opening operation alarm processing is finished, and it returns to step S1 of the operation alarm processing.

The operation alarm processing and the opening operation alarm processing are repeated while a seating of a passenger seat S is detected by the seat detector. When the seating is not detected, and opening operation of all the door body D is not detected within a certain period of time, their processing are finished.

According to the embodiment of the present invention, there are effects as below. More specifically, when the ECU receives the operation detecting signal, that is, when the hand of the passenger approaches the opening and closing operation section H, the alarm device for the vehicle 1 generates an alarm. Thereby, the passenger can easily recognize the alarm for the opening operation of the door body D, and it is possible to prevent the door body D from being opened when the other vehicle approaches from behind.

In addition, when the vehicle C stops and the ECU does not receive the vehicle detecting signal, the lame section 14 displays the safety sign. Thereby, the passenger is easy to recognize the propriety of the opening operation of each door body D.

Further, the vibration unit 12 and the lamp section 14 function as an alarm generator. Thus, the passenger can easily recognize an alarm. Furthermore, since the vibration unit 12 vibrates the opening and closing operation section H, the passenger can surely recognize the alarm against the opening operation.

Also, when the door body D is opened, the warning light 13 irradiates light backward. Thereby, the alarm device for the vehicle of the present invention can alert a rear vehicle or a pedestrian when the door body D is opened. Furthermore, since the warning light 13 is blinked with a cycle according to the speed of the approaching other vehicle from behind, it is possible to effectively alert the passenger as the speed of the approaching other vehicle is higher.

Further, the sensor section 11 detects the approaching of the passenger hand with infrared rays. So, the sensor section 11 can transmit the operation detecting signal before the passenger hand contacts to the opening and closing operation section H, and the alarm device for the vehicle 1 can surely generate an alarm before the door body D is opened.

Also, the present invention is not limited to the above embodiments, and includes other arrangement as desired can be achieved according to the present invention. Further, deformation as described below is included in the present invention. For example, in the above embodiment, the lamp section 14 flashes in blue, and thereby the safety sign can be displayed. However, the alarm device for the vehicle of the present invention may be a configuration in which the lamp section does not display the safety sign. For example, by omitting the safety indication, it is possible to reduce the kind of color that the lamp section emits light, and thereby the configuration and control can be simplified. Furthermore, it may be an indication that the safety sign is safe. For example, the lamp section may flashes in green color reminding green light, or may illuminate the lights. Further, the lamp section may flash so that luminance is gradually changed in a relatively long period Also, in the above embodiment, the vibration unit 12 and the lamp section 14 function as the alarm generator. However, it is not limited thereto. For example, either the vibration unit 12 or the lamp section 14 may be provided. Further, a speaker may be provided as an alarm sound generator so as to generate alarm sound. Furthermore, a locking unit for locking the door may be provided. Additionally, an irradiation unit may be provided so as to irradiate lights near the meter display M. of course, the speaker and the irradiation unit may be combined, and the alarm generator, the alarm sound generator, the locking unit, and the irradiation unit may be combined.

Further, in the above embodiment, by blinking warning light 13, an attention to the other vehicle or pedestrian is urged, but it is not limited thereto. For example, the courtesy lamp L may function as the warning light, and the warning light may be omitted.

Further, in the above embodiment, the vehicle detector measures the speed of the other vehicle, and the warning light 13 flashes with a cycle corresponding to the speed of the other vehicle, but it is not limited thereto. For example, the vehicle detector may measure the distance from the other vehicle, and the warning light may be configured to flash with a cycle corresponding to the distance from the other vehicle. Further, the vehicle detector may only detects that the other vehicle approaches, and the warning light 13 may continuously lit without flashing the warning light 13.

Further, in the above embodiment, the sensor section 11 as the operation detector detects the approach of the hand of the passenger with infrared rays, but it is not limited thereto. The operation detector may detect that of the hand of the passenger contacts on the opening and closing operation section H, and that the opening and closing operation section H is operated. According to the above construction, a translucent section for transmitting infrared rays can be omitted, and thereby the construction can be simplified.

Further, in the above embodiment, when the ECU receives the opening operation signal, the warning light 13 is always blinked, but it is not limited thereto. For example, when the ECU receives the vehicle detecting signal and the opening operation signal, the warning light 13 can blink.

The illustrated embodiments of the present invention have been described for illustrative purposes only, and not by way of limiting the invention. Accordingly, the present invention can be implemented with various modifications made thereto within the scope of the present invention.

REFERENCE SIGNS LIST 1 alarm device for vehicle
11 sensor section (operation detector)
12 vibration unit
13 warning light
14 lamp section (irradiation unit)

The invention claimed is:
1. An alarm device for a vehicle detecting an approach of another vehicle and generating an alarm comprising:
a vehicle detector detecting an approach of another vehicle from behind;
an operation detector arranged on a door body, and detecting an approach of a hand of a passenger to an opening and closing operation section of the door body;
an alarm generator generating the alarm to the passenger;
a controller generating an alarm on the alarm generator when the vehicle detector detects the approach of the another vehicle, and the operation detector detects the approach of the hand of the passenger;
a warning light arranged on the door body and configured to illuminate light backward; and an opening operation detector detecting that the door is opened, wherein the vehicle detector measures at least one of a distance from the another vehicle and a speed of the another vehicle, and wherein when the vehicle detector detects the approach of the another vehicle, and the opening operation detector detects that the door is opened, the controller controls the warning light blinking with a cycle corresponding to at least one of the distance from the another vehicle and the speed of the another vehicle.

2. The alarm device for the vehicle according to claim 1, wherein the alarm generator is configured to display a safety sign indicating that the door body is able to safely open, and wherein the controller displays the safety sign on the alarm generator when the vehicle detector does not detect the approach of the other vehicle.

3. The alarm device for the vehicle according to claim 2, wherein the alarm generator includes at least one of an irradiation unit for irradiating light, an alarm sound generator for generating an alarm sound, a vibration unit for vibrating the opening and closing operation section, and a locking unit for locking the door body.

4. The alarm device for the vehicle according to claim 1, wherein the alarm generator includes at least one of an irradiation unit for irradiating light, an alarm sound generator for generating an alarm sound, a vibration unit for vibrating the opening and closing operation section, and a locking unit for locking the door body.

\* \* \* \* \*